United States Patent [19]

Shiratori et al.

[11] Patent Number: 5,368,951
[45] Date of Patent: Nov. 29, 1994

[54] SOLID OXIDE FUEL CELL

[75] Inventors: Akira Shiratori; Hiroshi Takagi, both of Nagaokakyo, Japan

[73] Assignee: Murata Manufacturing Co., Ltd.

[21] Appl. No.: 66,987

[22] Filed: May 25, 1993

[30] Foreign Application Priority Data

May 28, 1992 [JP] Japan .................. 4-135469

[51] Int. Cl.⁵ .................. H01M 4/90; H01M 8/12
[52] U.S. Cl. .................. 429/30; 429/45; 29/623.3
[58] Field of Search .................. 429/30, 44, 45; 29/623.3

[56] References Cited

U.S. PATENT DOCUMENTS

| | | | |
|---|---|---|---|
| 3,300,344 | 1/1967 | Bray | 136/86 |
| 4,582,766 | 4/1986 | Isenberg et al. | 429/45 X |
| 4,816,036 | 3/1989 | Kotchik | 429/30 X |
| 5,035,962 | 7/1991 | Jensen | 429/40 |
| 5,064,734 | 11/1991 | Nazmy | 429/44 X |
| 5,169,731 | 12/1992 | Yoshimura et al. | 429/30 |

FOREIGN PATENT DOCUMENTS

| | | |
|---|---|---|
| 439938 | 8/1991 | European Pat. Off. . |
| 1460932 | 12/1966 | France . |
| 1513897 | 2/1968 | France . |
| 2528416 | 12/1983 | France . |
| 2945565 | 5/1980 | Germany . |

OTHER PUBLICATIONS

Journal of the Electrochemical Society, vol. 134, No. 88, Aug. 1987 Manchester, New Hampshire, p. 414C, U. Bardi et al., "Metal-Zirconia Interfacial Reactions in Solid Oxide Fuel Cell Anodes".

Patent Abstracts of Japan, vol. 16, No. 246, (E-1212)5, Jun. 1992 of JP-A-04 051 462 (Yuasa Battery Co. Ltd.), 19 Feb. 1992.

Primary Examiner—Stephen Kalafut
Attorney, Agent, or Firm—Ostrolenk, Faber, Gerb & Soffen

[57] ABSTRACT

A solid oxide fuel cell which has a solid electrolyte having an air electrode and a fuel electrode on its upper and lower surfaces respectively. The fuel electrode is made of a mixture of nickel, zirconium oxide and chromium oxide.

9 Claims, 1 Drawing Sheet

SOLID OXIDE FUEL CELL

BACKGROUND OF THE INVENTION

1. Field of the Invention

The present invention relates to a solid oxide fuel cell.

2. Description of Related Art

One of the conventional types of solid oxide fuel cells is a plate type. This type of solid oxide fuel cell has a laminate structure of cell units and interconnectors. Each cell unit comprises a solid electrolyte having a fuel electrode on one side and an air electrode on the other side, and conductive distributors which distribute a fuel gas (such as hydrogen) and air (or oxygen) entirely and evenly to the fuel electrode and the air electrode, respectively, and which also act as transmitters of electricity generated on the electrodes. The plate type solid oxide fuel cell has an advantage of having a large output per a unit volume. This is for the following reasons: By using thinner components, namely, thinner electrolytes and thinner interconnectors, a solid oxide fuel cell which contains more cell units keeping the same thickness can be obtained. Additionally, an electric current generated by the solid oxide fuel cell flows in the vertical direction, that is, in the thicknesswise direction, and the resistance is small. As a method of producing a thinner solid oxide fuel cell of this plate type, it has been suggested to sinter the components together after lamination of the components.

The electrodes are required to be excellently conductive and to be porous in such a degree as to allow gases to diffuse therein. Conventionally, a cermet of nickel and zirconium oxide has been used as the material of the fuel electrode. Generally, solid oxide fuel cells are operated at a temperature of about 1000° C. for a long time, and during the operation, the cermet of nickel and zirconium oxide is being sintered to excess and losing its porosity. Moreover, if the above-mentioned producing method (sintering after lamination), in which the sintering temperature is over 1300° C., is adopted, the porosity of the fuel electrode cannot be guaranteed.

SUMMARY OF THE INVENTION

It is an object of the present invention to provide a solid oxide fuel cell which has fuel electrodes which can maintain a sufficient porosity even after high temperature sintering and under high temperature operating conditions.

In order to attain the object, a solid oxide fuel cell according to the present invention has fuel electrodes made of a mixture of nickel, zirconium oxide and chromium oxide.

During sintering over 1300° C., the chromium oxide contained in the material of the fuel electrodes inhibits sintering of the fuel electrodes such that the fuel electrodes can maintain a sufficient porosity. Additionally, while the solid oxide fuel cell is operated in a temperature of about 1000° C., the chromium oxide contained in the fuel electrodes inhibits sintering of the fuel electrodes.

BRIEF DESCRIPTION OF THE DRAWINGS

This and other objects and features of the present invention will be apparent from the following description with reference to the accompanying drawings in which.

DETAILED DESCRIPTION OF THE PREFERRED EMBODIMENTS

An exemplary solid oxide fuel cell according to the present invention is hereinafter described with reference to the accompanying drawings.

Figure 1:
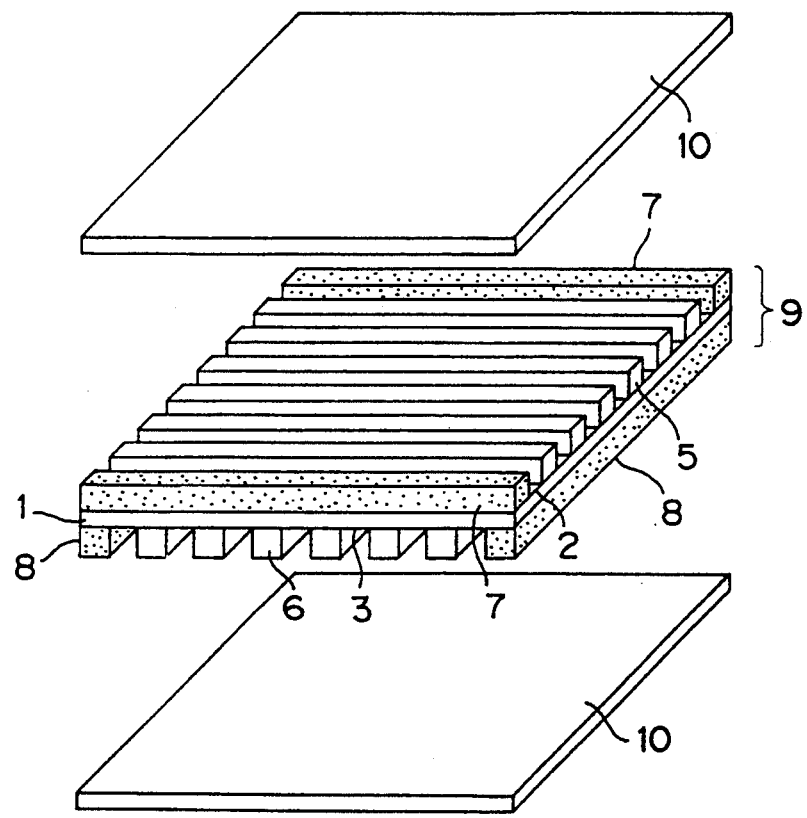
FIG. 1 is an exploded perspective view of a cell unit and interconnectors which form a solid oxide fuel cell according to the present invention.

FIG. 1 is an exploded view of a cell unit of a solid oxide fuel cell. A solid electrolyte 1 is rectangular and made of yttrium-stabilized zirconium oxide or the like. An air electrode 2 and a fuel electrode 3 are provided on an upper surface and a lower surface of the solid electrolyte 1 respectively. The air electrode 2 is made of lanthanum manganate or the like. The fuel electrode 3 is made of a mixture of nickel, zirconium oxide and chromium oxide.

Ribbed distributors 5 and 6 are provided on the air electrode 2 and the fuel electrode 3. These distributors 5 and 6 distribute air and a fuel gas evenly to the air electrode 2 and the fuel electrode 3, respectively, and electrically connect these electrodes 2 and 3 with interconnectors 10, respectively. The air distributor 5 is made of lanthanum manganate or the like, and the fuel distributor 6 is made of a cermet of nickel and zirconium oxide or the like.

Spacers 7 and 8 are provided at both sides of the distributors 5 and 6 respectively to shut the air and the fuel gas from the outside air. The spacers 7 and 8 are made of yttrium-stabilized zirconium oxide or the like.

Thus, a cell unit 9 is fabricated from the electrolyte 1 having the air electrode 2 and the fuel electrode 3 on its upper and lower surfaces, respectively, the distributors 5 and 6, and the spacers 7 and 8. Then, interconnectors 10 are provided on an upper surface and a lower surface of the cell unit 9. The interconnectors 10 are made of lanthanum chromium or the like.

Figure 2:
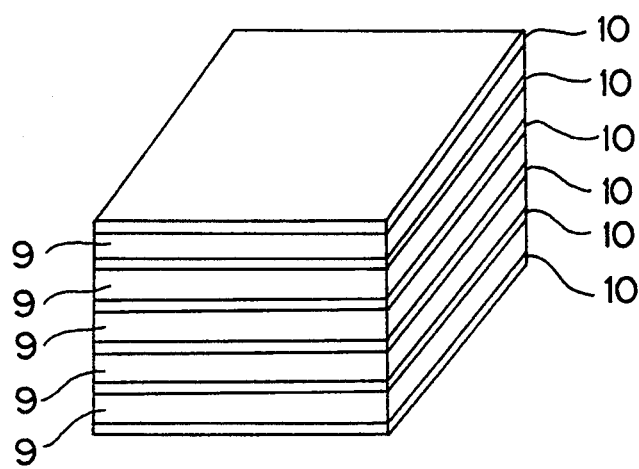
FIG. 2 is a perspective view of the solid oxide fuel cell according to the present invention.

As mentioned, the material of the fuel electrode 3 is a mixture of nickel, zirconium oxide and chromium oxide. We made an experiment to find out suitable mixing ratios of the constituents. Eight lots (No. 1–8) of fuel electrodes were prepared by using eight mixtures of nickel, zirconium and chromium oxide which were different in the mixing ratios by weight of zirconium oxide and chromium oxide. The mixing ratio by weight of nickel was fixed at 45% for all the mixtures. Using the eight lots of fuel electrodes, eight lots of cell units were fabricated in the above-described manner. Then, as shown in FIG. 2 by laminating five cell units 9 of the same lot with interconnectors 10 in between and subjecting the laminate to sintering at a temperature of 1300° for 2 hours, a solid oxide fuel cell 20 was made. In the same manner, eight kinds of solid oxide fuel cells were prepared. Further, these solid oxide fuel cells 20 were exposed to an atmosphere of hydrogen at a temperature of 1000° C. for a certain time, which is similar to ordinary operating conditions. Thereafter, the eight kinds of solid oxide fuel cells 20 were examined. Table 1 shows the result.

TABLE 1

| Lot No. | Constituents of Fuel Electrode | | | Porosity of Fuel Electrode (%) | Joining Condition between Fuel Electrode and Electrolyte |
|---|---|---|---|---|---|
| | Nickel (%) | Zirconium Oxide (%) | Chromium Oxide (%) | | |
| 1 | 45 | 55 | 0 | 5 | Joined |
| 2 | 45 | 54 | 1 | 10 | Joined |
| 3 | 45 | 53 | 2 | 35 | Joined |
| 4 | 45 | 50 | 5 | 40 | Joined |
| 5 | 45 | 45 | 10 | 42 | Joined |
| 6 | 45 | 35 | 20 | 42 | Joined |
| 7 | 45 | 30 | 25 | 35 | Separated |
| 8 | 45 | 20 | 35 | 25 | Separated |

As long as the mixing ratio by weight of chromium oxide was within a range from 2% to 25%, the porosity was 35% or more, which is sufficient to be used as an electrode. As long as the mixing ratio by weight of chromium oxide was 20% or less, the fuel electrode 3 and the solid electrolyte 1 kept joined together. When the mixing ratio by weight of chromium oxide was 25% or more, the fuel electrode 3 separated from the solid electrolyte 1. This may be because the fuel electrode 3 shrunk with reaction (reduction) under the operating conditions. Accordingly, it is preferred that a mixture of nickel, zirconium oxide and chromium oxide of which mixing ratio by weight of chromium oxide is within a range from 2% to 20% is used as the material of the fuel electrode 3.

By using fuel electrodes made of such a mixture of nickel, zirconium oxide and chromium oxide, a solid oxide fuel cell which has fuel electrodes which can maintain a sufficient porosity after high temperature sintering and under high temperature operating conditions can be obtained.

Although the present invention has been described in connection with the preferred embodiment above, it is to be noted that various changes and modifications are possible to those who are skilled in the art. Such changes and modifications are to be understood as being within the scope of the invention.

The mixing ratio by weight of nickel may not be 45%, and the mixing ratio can be altered, as long as the conductivity, porosity and joining condition with the solid electrolyte can be sufficiently maintained. The mixing ratios by weight of zirconium oxide and chromium oxide are determined in accordance with that of nickel.

The above embodiment is a solid oxide fuel cell which is fabricated by laminating components and sintering together. However, the present invention is applicable to a solid oxide fuel cell which is fabricated by laminating and joining sintered components by use of bond.

Further, the present invention is applicable to a solid oxide fuel cell which does not have separate distributors but has air electrodes and fuel electrodes which also function as air distributors and fuel distributors respectively.

What is claimed is:

1. A solid oxide fuel cell unit comprising:
   a solid electrolyte;
   an air electrode provided on a first surface of the solid electrolyte; and
   a fuel electrode provided on a second surface of the solid electrolyte;
   wherein the fuel electrode is made of a mixture of nickel, zirconium oxide and chromium oxide.

2. A solid oxide fuel cell unit as claimed in claim 1, wherein the solid electrolyte, the air electrode and the fuel electrode are laminated and sintered together.

3. A solid oxide fuel cell unit as claimed in claim 1, wherein the fuel electrode contains nickel at a mixing ratio by weight of 45% and chromium oxide at a mixing ratio by weight within a range from 2% to 20%.

4. A solid oxide fuel cell comprising:
   a plurality of solid oxide fuel cell units, each of said fuel cell units comprising:
   a solid electrolyte;
   an air electrode provided on a first surface of the solid electrolyte; and
   a fuel electrode provided on a second surface of the solid electrolyte;
   wherein the fuel electrode is made of a mixture of nickel, zirconium oxide and chromium oxide.

5. A solid oxide fuel cell as claimed in claim 4, wherein said plurality of solid fuel cell units is laminated and sintered together.

6. A solid oxide fuel cell as claimed in claim 4, wherein each of said fuel electrodes contains nickel at a mixing ratio by weight of 45% and chromium oxide at a mixing ratio by weight within a range from 2% to 20%.

7. A method for assembling a solid oxide fuel cell, said fuel cell comprising:
   a plurality of solid oxide fuel cell units, each of said fuel cell units comprising:
   a solid electrolyte;
   an air electrode provided on a first surface of the solid electrolyte; and
   a fuel electrode comprising a mixture of nickel, zirconium oxide and chromium oxide provided on a second surface of the solid electrolyte;
   said method comprising the step of laminating and sintering together said plurality of solid oxide fuel cell units.

8. A solid oxide fuel cell unit as claimed in claim 1, wherein the chromium oxide inhibits sintering of the fuel electrode such that the fuel electrode maintains a porosity sufficient to allow the gases to diffuse therein.

9. A solid oxide fuel cell as claimed in claim 4, wherein the chromium oxide inhibits sintering of the fuel electrodes such that the fuel electrodes maintain a porosity sufficient to allow gases to diffuse therein.

* * * * *